US005510608A

United States Patent [19]

Williams

[11] Patent Number: 5,510,608

[45] Date of Patent: Apr. 23, 1996

[54] RETURN MAIL PIECE AND METHOD OF MARKING THE SAME

[75] Inventor: Robert L. Williams, Omaha, Nebr.

[73] Assignee: Board of Regents-Univ. of Nebraska, Lincoln, Nebr.

[21] Appl. No.: 250,568

[22] Filed: May 27, 1994

Related U.S. Application Data

[63] Continuation-in-part of Ser. No. 2,195, Jan. 8, 1993, Pat. No. 5,324,927.

[51] Int. Cl.[6] .......... G06K 19/04

[52] U.S. Cl. .......... 235/494; 229/68.1; 209/584; 283/116

[58] Field of Search .......... 235/494, 487; 209/584; 229/68.1, 302; 283/119

[56] References Cited

U.S. PATENT DOCUMENTS

| | | | |
|---|---|---|---|
| 2,675,170 | 4/1954 | Sebesta | 229/68.1 |
| 2,775,405 | 12/1956 | Paston | 235/61.12 |
| 2,890,825 | 6/1959 | Patrick | 229/68 |
| 3,349,226 | 10/1967 | Goldstern | 229/68.1 |
| 3,506,186 | 4/1970 | Von Clemm | 229/68.1 |
| 3,614,396 | 10/1971 | Goldstern | 235/61.12 R |
| 3,933,094 | 1/1976 | Murphy et al. | 101/426 |
| 4,117,975 | 10/1978 | Gunn | 235/494 |
| 4,317,030 | 2/1982 | Berghell | 235/489 |
| 4,445,635 | 5/1984 | Barr | 229/73 |
| 4,601,396 | 7/1986 | Pavie | 209/569 |
| 4,602,736 | 7/1986 | Barr | 229/73 |
| 4,688,715 | 8/1987 | Barr | 229/73 |
| 4,743,747 | 5/1988 | Fougere et al. | 235/494 |
| 4,796,196 | 1/1989 | Durst, Jr. et al. | 364/478 |
| 4,800,504 | 1/1989 | Durst Jr. et al. | 364/464.02 |

FOREIGN PATENT DOCUMENTS

| | | | |
|---|---|---|---|
| 1463663 | 12/1966 | France | 283/116 |

*Primary Examiner*—John Shepperd

*Attorney, Agent, or Firm*—Zarley, McKee, Thomte, Voorhees & Sease; Mark D. Frederiksen

[57] ABSTRACT

A return mail piece includes a generally rectangular sheet of material with a delimited mailing address zone and a bar code zone on the front of the sheet, and a subclassification zone on the rearward surface of the sheet. Site location indicia is printed within the mailing address zone to identify the address of the site location. Separate subclassification indicia is printed within the subclassification zone so as to identify one of a plurality of end locations as the site location.

5 Claims, 1 Drawing Sheet

RETURN MAIL PIECE AND METHOD OF MARKING THE SAME

CROSS-REFERENCE TO RELATED APPLICATION

This is a continuation-in-part of application Ser. No. 08/002,195 filed Jan. 8, 1993, now U.S. Pat. No. 5,324,927.

TECHNICAL FIELD

The present invention relates generally to mail pieces which are returned to a sender, and more particularly to a return mail piece which is specially marked by the sender to enable the sender to precisely classify or sort the return mail piece, and a method of accomplishing the marking of the mail piece.

BACKGROUND OF THE INVENTION

It is not uncommon for large businesses to supply pre-addressed return envelopes to various consumers or clientele. The distribution of such return mail pieces is accomplished in many ways. For instance, a tear-out return card affixed in a magazine is one type of return mail piece. Return envelopes are commonly provided by large businesses in association with billing statements to various clients. Numerous other types of return mail pieces are utilized in various businesses.

Automatic processing machinery currently utilized by the postal service have optical character readers (OCR) which can read certain address indicia printed in a preselected mailing address zone located on the front on an envelope. The OCR reads the printed mailing address in the mailing address zone, and prints a bar code representing the zip code in a bar code zone on the front of the envelope below the mailing address zone. The bar code zone extends along the lower right edge of the envelope at a predetermined height and width.

Bar code readers are utilized in the automatic processing of mail to quickly sort the mail in accordance with destination information in the automated process apparatus.

Many large businesses are able to preprint their return mail pieces, and preprint the destination bar code within the bar code zone on the return mail piece so that the postal service merely utilizes its computer controlled automated processing equipment to read the bar codes and sort the mail pieces. The mail pieces are then delivered by the postal service to the addressee listed in the mailing address zone.

While the mailing address and zip code provided on a given envelope are adequate to deliver a return mail piece to a general destination, the zip code cannot provide enough information to enable the business mailer to further sort and classify the mail as may be desired. Similarly, the mailing address zone is typically not large enough to enable the business mailer to specifically identify the various end locations to which the return mail piece is to be directed.

In addition, it may be desirable to further sort return mail pieces within a particular department to which the envelope is addressed, for demographic survey purposes, or other various reasons. Again, the mailing address zone of the envelope does not provide the necessary space required for further coding information.

SUMMARY OF THE INVENTION

It is therefore an object of the present invention to provide a return mail piece which has additional identification markings printed thereon in areas other than the mailing address zone.

Another object of the present invention is to provide a return mail piece with additional identification codings for the addressee, which may be read by conventional existing automated processing equipment.

Still another object is to provide a method for marking a return mail piece in a specified location on the envelope with additional identification coding to enable the addressee to further sort and classify the return mail piece upon receipt.

These and other objects will be apparent to those skilled in the art.

The return mail piece of the present invention includes a generally rectangular sheet of material with a delimited mailing address zone and a bar code zone on the front surface of the sheet, and a subclassification zone on the rearward surface of the sheet. Site location indicia is printed within the mailing address zone to identify the address of the site location. Separate subclassification indicia is printed within the subclassification zone so as to identify one of a plurality of end locations as the site location.

DESCRIPTION OF THE PREFERRED EMBODIMENT

Figure 1:
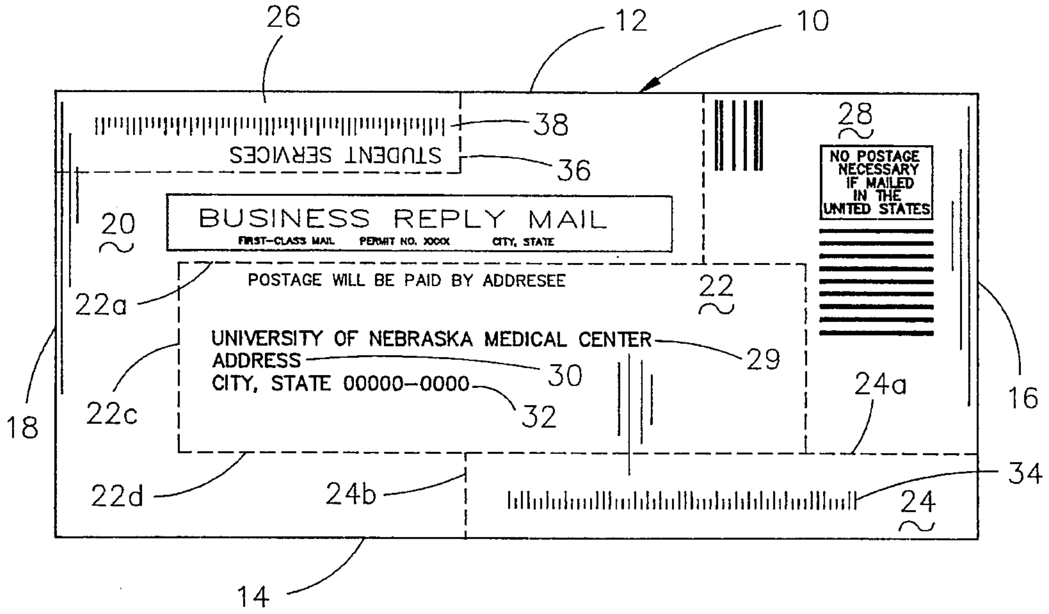
FIG. 1 is a front view of a return mail piece with printed indicia and identification coding located in various zones of the envelope according to the present invention.

Referring now the drawings, in which similar or corresponding pads are identified with the same reference numeral, and more particularly to FIG. 1, a mail piece is identified generally at 10 and includes an upper edge 12, a lower edge 14 a right end edge 16 a left end edge 18 and a front face 20.

A mailing address zone 22 is enclosed by dashed lines in FIG. 1, and is utilized by automatic mail processing equipment to delimit the boundaries for optical character readers in reading mailing address indicia. The mailing address zone is defined by the postal service as having an upper limit **22*a* spaced about two and one quarter inches above the lower edge 14 of the mail piece, and edges 22*b* and 22*c* spaced inwardly one inch from the end edges 16 and 18 respectively, and a lower limit 22*d* spaced about five-eighths of an inch above the lower edge 14 of the envelope. A bar code zone 24 is delimited on mail piece 10 and is located with an upper limit 24*a* spaced five-eighths of an inch from the lower edge 14 of the mail piece, and a left limit 24*b* spaced about four and a half inches from the right edge of the envelope, such that the bar code zone 24 is located in the lower right corner of mail piece 10**.

A return address zone 26 is located in the upper left portion of the envelope, above the mailing address zone 22, while a postage zone 28 is located in the upper right corner of the envelope 10.

Referring now to FIG. 1, envelope 10 has been printed under the method of this invention to provide additional location information to the recipient of the return mail piece, as described in more detail hereinbelow. Mailing address zone 22 has been imprinted with the business name 29, address 30 and zip code 32, in a conventional fashion. In addition, a bar code 34 is imprinted in bar code zone 24, to enable bar code readers of automatic mail processing equipment to automatically sort the envelope 10. Return mail envelopes such as that shown in FIG. 1, are commonly used by companies which mail out invoices, statements, advertising or the like during an initial mailing, and which provide the return mail piece 10 as part of the mailing, to be returned either to the original mailing address or to some other designated name or address. Thus, the original sender of the initial mailing prints the return mail piece 10, and desires to receive mail piece 10 by return mail.

In the case of large businesses, the space delimited as the mailing address zone 22 does not provide some of the desired highly specialized location information necessary to subclassify the return mail piece 10 and automatically direct it to an appropriate location. Thus, while envelope 10 will arrive at the general address listed in mailing address zone 22, according to the zip code 32 and bar code 34, many large businesses must then manually sort the mail to direct the return mail to appropriate departments, or for demographic survey purposes or the like.

The present inventor provides additional classifying information in the return address zone 26 of envelope 10. Information may be provided in the form of printed characters 36, utilizing letters and/or numerals. However, at present, conventional characters 36 are not located so as to be machine readable utilizing conventional automatic processing equipment. For this reason, the preferred embodiment of the invention utilizes a bar code 38 which is oriented upside down with respect to the orientation of the mailing address zone 22 and bar code zone 24. Thus, for purposes of automating, the return address zone 26 is preferably delimited using the same bar code zone 24 delimitations but in the opposite corner of the envelope. In this way, all of the return mail pieces 10 may be simply inverted and run through a conventional bar code reader of an automatic mail processing apparatus to further sort or classify the return mail pieces.

It can therefore be seen that mailing address zone 22 and bar code zone 24 provide general site location information, for the general location of the large business described in mail address zone 22. Return address zone 26 is provided with more specific identifying information which subclassifies the mail piece 10 after reaching the site location described in the mail address zone 22. In order to automate the sorting and classification of the return mail piece 10 at the site location described in mailing address zone 22, conventional printed indicia in the form of characters 36 and/or bar code 38 is imprinted in an inverted orientation within a special zone designated in the upper left hand corner of the mail piece 10 opposite of bar code zone 24.

Under the method of the present invention, the company which will be printing the return mail piece 10 will locate the desired return mail address within an address zone 22, a return mail bar code 34 within bar code zone 24, matching the zip code listed in line 32 of address zone 22. A separate return address zone 26 is delineated in the upper left hand corner of mail piece 10, opposite bar code zone 24. The appropriate subclassification information is printed in return address zone 26, to further classify the department or section to which the return mail piece 10 is to be sorted once reaching the site location listed in address zone 22. In the preferred embodiment of the invention, the information listed in return address zone 26 is printed in the form of bar code inverted in an upside down orientation such that the bar code can be read by a conventional bar code reader of automatic processing equipment, when the envelope is inserted in the bar code reader upside down.

Figure 2:
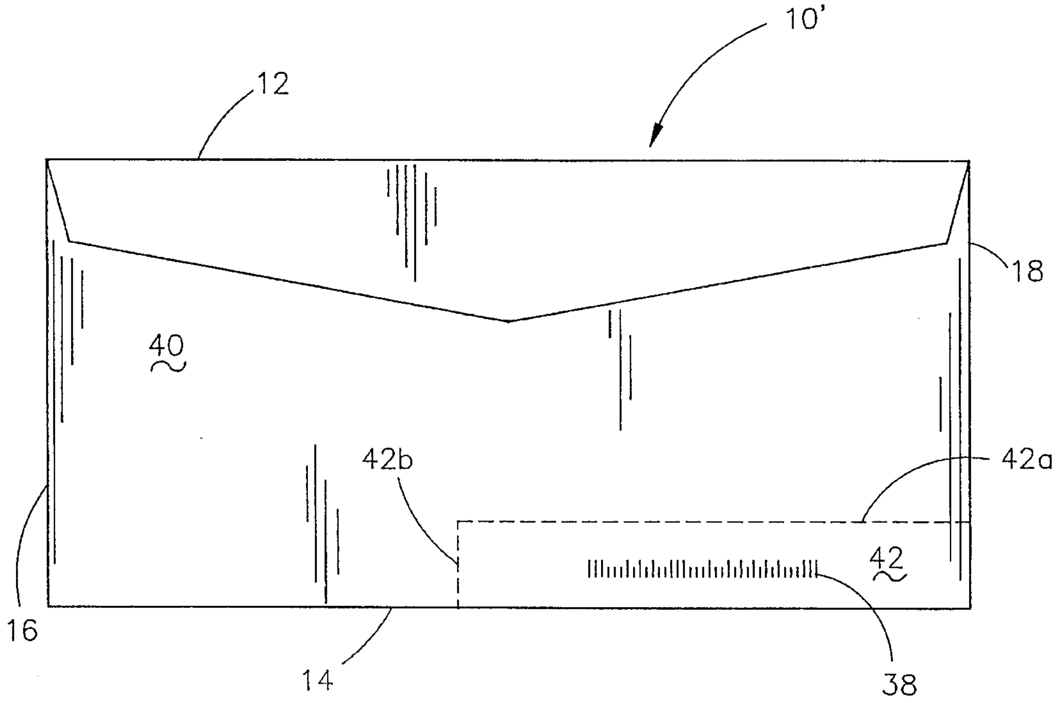
FIG. 2 is a rearward view of the return mail piece.

Referring now to FIG. 2, a second embodiment of the mail piece is identified generally at 10' with the same upper edge 12, lower edge 14, right end edge 16, left end edge 18, but showing the rearward face 40 of the mail piece, or envelope 10'. A subclassification zone 42 is delimited on rearward face 40 of envelope 10 with an upper limit **42*a* and a left limit 42*b* located in an equivalent position in the lower right hand corner of rearward face 40 as the bar code zone 24 in the lower right hand corner of front face 20. Subclassification indicia 38 is provided in subclassification zone 42 in an upright orientation relative to the printed indicia on the front face 20 of mail piece 10**.

Under the method of this second embodiment of the invention, a company preparing the return mail piece 10 will locate the desired return mail address site location within the address zone 22 on the front face 20 of mail piece 10. Preferably, a return mail bar code 34 is located within bar code zone 24 on front face 20, for use by a conventional code reader of automatic processing equipment. The appropriate subclassification indicia is then located in subclassification zone 42 on the rearward surface 40 of mail piece 10', to further classify the department or section to which the return mail piece 10' is to be sorted upon reaching the site location listed in address zone 22. Preferably, subclassification indicia 38 is printed in the same machine readable format as that utilized in bar code zone 24, so that the same automatic processing equipment utilized to read bar code zone 24 can also be utilized to read printed indicia 38 within subclassification zone 42.

Thus, the final steps of the method of the second embodiment includes receiving the mail piece at the site location indicated in the address zone 22, reversing the mail piece 10', while maintaining the mail piece in the upright position, and running the mail piece 10' through the same automatic processing equipment so as to read the subclassification indicia 38 from rearward face 40 in subclassification zone 42. The mail piece 10' is then sorted according to this subclassification indicia 38.

Whereas the invention has been shown and described in connection with the preferred embodiments thereof, it will be understood that many modifications, substitutions and additions may be made which are within the intended broad scope of the appended claims. For example, while the machine readable code shown in bar code zone 24, return address zone 26 and subclassification zone 42 each disclose bar code, other types of machine readable code are envisioned which may be located in different locations on the mail piece 10. However, it is envisioned that the machine readable code will have an orientation defined as "upright" relative to the printed indicia in address zone 22, so that the machine readable code 38 in subclassification zone 42 will be oriented in the same relative orientation as the machine readable code 34. Similarly, this machine readable code may be located in specific locations on the front face of mail piece 10 other than the bar code zone 24. In such a case, it is intended that machine readable code 38 may also be located in other locations than the lower right hand corner of the back face 40 of mail piece 10'. In addition, while postcards and conventional envelopes are set forth specifically in this specification, "window" type envelopes with appropriate printed indicia viewable therethrough are also contemplated within the scope of this invention.

I claim:

1. A return mail piece for a site location having a plurality of end locations, comprising:

a mail piece having a front surface and a rearward surface, said front and rearward surfaces having a common upper edge, lower edge, right end edge and left end edge;

said front surface having an address zone with site location indicia therein in an upright orientation relative to the lower edge, identifying the address of the site location;

said front surface having a bar code zone located in a predetermined position on the front surface relative to the lower edge and right end edge;

bar code indicia located within said bar code zone in a predetermined orientation relative to the lower edge on the front surface of the mail piece, said indicia representing site location indicia in machine readable code;

said rearward surface having a subclassification zone located in the same position on the mail piece rearward surface, relative to the mail piece common left end edge and lower edge, as the location of the bar code zone on the mail piece front surface, relative to the mail piece common right end edge and lower edge; and subclassification indicia located within said subclassification zone, and in the same predetermined orientation relative to the lower edge as the bar code indicia, said subclassification indicia being in machine readable code.

2. The return mail piece of claim 1, wherein the bar code indicia and subclassification indicia are in an upright orientation.

3. The return mail piece of claim 2, wherein the bar code indicia and subclassification indicia are bar code.

4. A method for sorting return mail pieces received at a site location into categories comprised of a plurality of end locations at the site location, the mail piece being of a type having an address zone and a bar code zone at predetermined locations on a front surface of the mail piece relative to a lower edge and right end edge common to the front and rearward surfaces of the mail piece, comprising the steps of:

printing site location indicia in an upright orientation in a predetermined mailing address zone on a front surface of a mail piece;

printing end location indicia in a predetermined subclassification zone on a rearward surface of the mail piece, said subclassification zone being located in the same position on the rearward surface of the mail piece relative to the common lower and left end edge as the location of the bar code zone on the mail piece forward surface relative to the common lower and right end edge, said end location indicia printed in an upright orientation with respect to the site location indicia;

mailing the return mail piece to a predetermined entity;

receiving the return mail piece at the site location indicated by the site location indicia in the mailing address zone;

reading the end location indicia in the subclassification zone; and sorting the mail piece according to the end location read in the reading step; and distributing the mail piece to the end location read in the reading step.

5. The method of claim 4, wherein the step of reading the end location indicia includes the step of reversing the mail piece to position the rearward surface to the front prior to reading the indicia in the subclassification zone.

* * * * *